United States Patent
Takemasu et al.

(10) Patent No.: US 11,548,968 B2
(45) Date of Patent: Jan. 10, 2023

(54) POLYORGANOSILOXANE-CONTAINING GRAFT COPOLYMER POWDER, AND RESIN COMPOSITION USING THE SAME, AND MOLDED ARTICLE FORMED OF THE SAME

(71) Applicant: Mitsubishi Chemical Corporation, Tokyo (JP)

(72) Inventors: Kenta Takemasu, Tokyo (JP); Masahiro Ueda, Tokyo (JP); Shinji Matsuoka, Tokyo (JP); Hiroya Arai, Tokyo (JP); Misaki Hagi, Tokyo (JP); Masashi Iimori, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 332 days.

(21) Appl. No.: 17/000,826

(22) Filed: Aug. 24, 2020

(65) Prior Publication Data

US 2020/0385504 A1 Dec. 10, 2020

Related U.S. Application Data

(63) Continuation of application No. PCT/JP2019/007496, filed on Feb. 27, 2019.

(30) Foreign Application Priority Data

Feb. 27, 2018 (JP) .............................. JP2018-033345

(51) Int. Cl.
*C08F 283/12* (2006.01)
*C08L 51/08* (2006.01)
*C08L 67/03* (2006.01)
*C08L 69/00* (2006.01)
*C08F 285/00* (2006.01)

(52) U.S. Cl.
CPC .......... *C08F 283/12* (2013.01); *C08F 285/00* (2013.01); *C08L 51/085* (2013.01); *C08L 67/03* (2013.01); *C08L 69/00* (2013.01)

(58) Field of Classification Search
CPC ..... C08L 51/085; C08F 283/12; C08F 285/00
See application file for complete search history.

(56) References Cited

FOREIGN PATENT DOCUMENTS

| JP | 09-003146 A | * | 1/1997 |
|---|---|---|---|
| JP | H09-003146 A | | 1/1997 |
| JP | 2625988 B2 | * | 7/1997 |
| JP | 2001-064318 A | * | 3/2001 |
| JP | 2001-139789 A | | 5/2001 |
| JP | 2003-277450 A | | 10/2003 |
| JP | 2005-330467 A | | 12/2005 |
| JP | 2007-231149 A | | 9/2007 |
| JP | 2007-326314 A | | 12/2007 |
| JP | 2014-156536 A | | 8/2014 |

OTHER PUBLICATIONS

Machine translation of JP 09-003146 A (no date).*
Machine translation of JP 2001-064318 (no date).*
Machine translation of JP 2625988 B2 (no date).*
Extended European Search Report issued in corresponding European Patent Application No. 19760347.5 dated Mar. 16, 2021.
International Search Report issued in related International Patent Application No. PCT/JP2019/007496 dated Jun. 4, 2019.

* cited by examiner

Primary Examiner — Marc S Zimmer
(74) Attorney, Agent, or Firm — Morgan, Lewis & Bockius LLP

(57) ABSTRACT

An object of the present invention is to provide a polyorganosiloxane-containing graft copolymer powder capable of providing a resin composition and a molded article which are excellent in balance between colorability and mechanical properties such as impact resistance. The polyorganosiloxane-containing graft copolymer powder according to the present invention is a graft copolymer powder obtained by graft-polymerizing a mixture (B) of a vinyl monomer (b1) having an epoxy group and another vinyl monomer (b2) to a rubber (A) containing a polyorganosiloxane, wherein the content of the polyorganosiloxane (A1) contained in the rubber (A) is 12 to 50% by mass, the mass average particle diameter of the polyorganosiloxane-containing graft copolymer powder is 300 to 2000 nm, and the epoxy equivalent of the polyorganosiloxane-containing graft copolymer powder is 2500 to 7800 g/eq.

11 Claims, No Drawings

POLYORGANOSILOXANE-CONTAINING GRAFT COPOLYMER POWDER, AND RESIN COMPOSITION USING THE SAME, AND MOLDED ARTICLE FORMED OF THE SAME

TECHNICAL FIELD

The present invention relates to a polyorganosiloxane-containing graft copolymer powder, and a resin composition containing the polyorganosiloxane-containing graft copolymer powder, and a molded article formed of the resin composition.

BACKGROUND ART

Resins such as aromatic polyester resins are excellent in transparency, impact resistance, heat resistance, dimensional stability, and the like as general-purpose engineering plastics, and are widely used industrially as materials in the automotive field, the OA equipment field, the electric and electronic fields, and the like due to their excellent characteristics. In order to improve the impact resistance of these resins, a method of adding an impact modifier has been used.

In addition, in recent years, molded articles obtained from the resins have been used in some cases without coating for the purpose of reducing the cost of a product, mainly for applications such as an electric and electronic apparatus housing and a home electric appliance, and are required to color the resins themselves to a desired color tone.

For example, Patent Literatures 1 and 2 disclose the use of a specific polyorganosiloxane-based graft copolymer as an impact strength modifier for such as a polybutylene terephthalate resin.

CITATION LIST

Patent Literature

Patent Literature 1: JP 2003-277450 A
Patent Literature 2: JP H09-3146 A

SUMMARY OF INVENTION

Technical Problem

However, even in the graft copolymers of Patent Literatures 1 and 2, there has been a case where a balance between colorability and impact resistance and other mechanical properties when added to a thermoplastic resin, particularly an aromatic polyester resin, is not sufficient. In addition, the colorability when added to an alloy system of an aromatic polycarbonate resin and an aromatic polyester resin was not sufficient.

It is an object of the present invention to provide a polyorganosiloxane-containing graft copolymer capable of providing a resin composition and a molded article which are excellent in balance between colorability and mechanical properties such as impact strength. It is also an object of the present invention to provide a resin composition and a molded article which are excellent in balance of colorability and mechanical properties such as impact strength.

Solution to Problem

The present invention includes the following aspects.

[1] A polyorganosiloxane-containing graft copolymer powder obtained by graft-polymerizing a mixture (B) of a vinyl monomer (b1) having an epoxy group and another vinyl monomer (b2) to a rubber (A) containing polyorganosiloxane, wherein a content of the polyorganosiloxane (A1) contained in the rubber (A) is 12 to 50% by mass, a mass average particle diameter of the polyorganosiloxane-containing graft copolymer powder is 300 to 2000 nm, and an epoxy equivalent weight of the polyorganosiloxane-containing graft copolymer powder is 2500 to 7800 g/eq.

[2] The polyorganosiloxane-containing graft copolymer powder according to [1], wherein the graft portion of the polyorganosiloxane-containing graft copolymer powder comprises a single layer structure containing an epoxy group or a multilayer structure containing an epoxy group at least in an outermost layer.

[3] The polyorganosiloxane-containing graft copolymer powder according to [1] or [2], wherein the vinyl monomer (b1) is contained in the vinyl monomer mixture (B) in an amount of 0.1 to 20% by mass.

[4] The polyorganosiloxane-containing graft copolymer powder according to any one of [1] to [3], wherein a content of the rubber (A) in the polyorganosiloxane-containing graft copolymer powder is in a range of 10 to 90% by mass.

[5] A resin composition comprising the polyorganosiloxane-containing graft copolymer powder according to any one of above [1] to [4].

[6] The resin composition according to [5], comprising a thermoplastic resin.

[7] The resin composition according to [6], comprising a polyester resin as the thermoplastic resin.

[8] The resin composition according to [7], wherein the polyester resin is an aromatic polyester resin.

[9] The resin composition according to [6], comprising a polyester resin and a polycarbonate resin as the thermoplastic resin.

[10] The resin composition according to [9], wherein the polyester resin is an aromatic polyester resin and the polycarbonate resin is an aromatic polycarbonate resin.

[11] A molded article comprising the resin composition according to any one of above [5] to [10].

Advantageous Effect of Invention

According to the present invention, it is possible to provide a polyorganosiloxane-containing graft copolymer capable of providing a resin composition and a molded article which are excellent in balance between colorability and mechanical properties such as impact strength. Furthermore, according to the present invention, it is possible to provide a resin composition and a molded article which are excellent in balance of colorability and mechanical properties such as impact strength.

DESCRIPTION OF EMBODIMENTS

Hereinafter, the present invention will be described in detail. In the present invention, "(meth)acrylate" means at least one of "acrylate" and "methacrylate". In the present invention, a polyorganosiloxane-containing graft copolymer may be simply referred to as a "graft copolymer".

<Polyorganosiloxane-Containing Graft Copolymer>

The powder of the polyorganosiloxane-containing graft copolymer (sometimes simply referred to as "graft copolymer") of the present invention is a polyorganosiloxane-containing graft copolymer powder obtained by graft-polymerizing a mixture (B) of a vinyl monomer (b1) having an epoxy group and another vinyl monomer (b2) to a rubber (A) containing a polyorganosiloxane, wherein the content of the polyorganosiloxane (A1) contained in the rubber (A) is 12 to 50% by mass, and the mass average particle diameter thereof is 300 to 2000 nm. The epoxy equivalent weight of the polyorganosiloxane-containing graft copolymer powder is preferably 2500 to 7800 g/eq. It is preferable to contain an epoxy group in at least an outermost layer of this polyorganosiloxane-containing graft copolymer powder. The graft portion of the polyorganosiloxane-containing graft copolymer powder contains an epoxy group, and the graft portion may be a single layer structure containing an epoxy group, or may be a multilayer structure containing an epoxy group at least in an outermost layer.

[Rubber (A) Containing Polyorganosiloxane]

As the rubber (A) containing a polyorganosiloxane, a composite rubber containing a polyorganosiloxane and a polyalkyl(meth)acrylate is preferred.

[Polyorganosiloxane]

A polyorganosiloxane is a polymer containing as a constitutional unit an organosiloxane unit in which at least one organic group is bonded to a silicon atom. The polyorganosiloxane can be obtained by polymerizing an organosiloxane, or a "organosiloxane mixture" containing an organosiloxane and one or more kinds of components to be used as needed. Examples of the component to be used as needed include a siloxane-based crosslinking agent, a siloxane-based graft crossing agent, and a siloxane oligomer having a terminal blocking group.

As the organosiloxane, any of a chain organosiloxane and a cyclic organosiloxane can be used. Cyclic organosiloxanes are preferred because of their high polymerization stability and high polymerization rate. As the cyclic organosiloxane, those having 3 to 7 membered rings are preferred, and examples thereof include the following. Hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like. One kind of these may be used alone, or two or more kinds thereof may be used in combination. Of these, 60% by mass or more in the organosiloxane is preferably an octamethylcyclotetrasiloxane because the particle diameter distribution of the polyorganosiloxane rubber to be formed is easily controlled.

As the organosiloxane, any of a chain organosiloxane, an alkoxysilane compound, and a cyclic organosiloxane can be used. Among them, an alkoxysilane compound and a cyclic organosiloxane are preferred, and a cyclic organosiloxane is more preferred because the polymerization stability is high and the polymerization rate is large.

As the alkoxysilane compound, a two-functional alkoxysilane compound is preferred, and examples thereof include dimethyldimethoxysilane, dimethyldiethoxysilane, diethoxydiethylsilane, dipropoxydimethylsilane, diphenyldimethoxysilane, diphenyldiethoxysilane, methylphenyldimethoxysilane, methylphenyldiethoxysilane, and the like.

As the cyclic organosiloxane, a organosiloxane having a 3-7 membered ring is preferable, and examples thereof include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane. These may be used one kind alone or a combination of two or more. Among these, since the particle diameter distribution of the polyorganosiloxane to be formed is easily controlled, the main component is preferably octamethylcyclotetrasiloxane, and 60% by mass or more in the organosiloxane is preferably octamethylcyclotetrasiloxane.

As the organosiloxane, a cyclic dimethylsiloxane and/or a bifunctional dialkylsilane compound is preferably used because a graft copolymer having higher low-temperature impact resistance can be obtained.

The cyclic dimethylsiloxane is a cyclic siloxane having two methyl groups on a silicon atom, and examples thereof include hexamethylcyclotrisiloxane, octamethylcyclotetrasiloxane, decamethylcyclopentasiloxane, and dodecamethylcyclohexasiloxane. These may be used singly or in combination of two or more thereof. Examples of the bifunctional dialkylsilane compound include dimethyldimethoxysilane, dimethyldiethoxysilane, diethoxydiethylsilane, and dipropoxydimethylsilane. These may be used singly or in combination of two or more thereof.

As the siloxane-based crosslinking agent, those having a siloxy group are preferred. By using a siloxane-based crosslinking agent, a polyorganosiloxane having a crosslinked structure can be obtained. Examples of the siloxane-based crosslinking agent include a 3 functional or 4 functional silane-based crosslinking agent such as trimethoxymethylsilane, triethoxyphenylsilane, tetramethoxysilane, tetraethoxysilane, tetra-n-propoxysilane, and tetrabutoxysilane. Among them, a 4 functional crosslinking agent is preferred, and tetraethoxysilane is more preferred. The content ratio of the siloxane-based crosslinking agent is preferably 0 to 30% by mass, more preferably 0 to 15% by mass, still more preferably 0 to 5% by mass, in 100% by mass of the organosiloxane mixture, and is preferably 0.05% by mass or more, more preferably 0.1% by mass or more, from the viewpoint of more sufficiently obtaining the addition effect. By setting the content ratio of the siloxane-based crosslinking agent to 0 to 30% by mass, a graft copolymer having good low-temperature impact resistance can be obtained.

The siloxane-based graft crossing agent is one having a siloxy group and a functional group polymerizable with a vinyl monomer. By using a siloxane-based graft crossing agent, a polyorganosiloxane having a functional group polymerizable with a vinyl monomer can be obtained. When the polyorganosiloxane has functional group polymerizable with a vinyl monomer, to this polyorganosiloxane, an alkyl (meth) acrylate component (a monomer component forming a polyalkyl (meth) acrylate constituting a composite rubber together with a polyorganosiloxane) and a vinyl monomer mixture (B), which are described later, can be grafted by radical polymerization.

Examples of the siloxane-based graft crossing agent include siloxanes represented by Formula (I):

$$RSiR^1_n(OR^2)_{(3-n)} \quad (I)$$

In Formula (I), $R^1$ represents a methyl group, an ethyl group, a propyl group, or a phenyl group. $R^2$ represents an organic group in an alkoxy group, and examples thereof include a methyl group, an ethyl group, a propyl group, or a phenyl group. n represents 0, 1 or 2. R represents any group represented by formulae (I-1) to (I-4).

$$CH_2=C(R^3)-COO-(CH_2)p- \quad (I-1)$$

$$CH_2=C(R^4)-C_6H_4- \quad (I-2)$$

$$CH_2=CH- \quad (I-3)$$

$$HS-(CH_2)p- \quad (I-4)$$

In these formulae, $R^3$ and $R^4$ represent a hydrogen atom or a methyl group, respectively, and p represents integers from 1 to 6.

Examples of the functional group represented by Formula (I-1) include a methacryloyloxyalkyl group. Examples of the siloxane having this group include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane.

One kind of these siloxane-based graft crossing agents may be used alone or in combination of two or more kinds thereof. The content ratio of the siloxane-based graft crossing agent is preferably 0 to 40% by mass, more preferably 0.05 to 40% by mass, and still more preferably 0.05 to 20% by mass, based on 100% by mass of the organosiloxane mixture, and is more preferably 0.1% by mass or more, and still more preferably 0.5% by mass or more, from the viewpoint of more sufficiently obtaining the addition effect. By setting the content ratio of the siloxane-based graft crossing agent to 0 to 40% by mass, a graft copolymer capable of providing a resin composition having good balance between low-temperature impact resistance and colorability can be obtained.

Further, the siloxane oligomer having a terminal blocking group refers to a siloxane oligomer having an alkyl group or the like at the terminal of an organosiloxane oligomer and stopping polymerization of a polyorganosiloxane.

Examples of the siloxane oligomer having a terminal blocking group include hexamethyldisiloxane, 1,3-bis(3-glycidoxypropyl)tetramethyldisiloxane, 1,3-bis(3-aminopropyl)tetramethyldisiloxane, and methoxytrimethylsilane.

[Method for Producing Polyorganosiloxane]

There is no particular limitation on the method for producing the polyorganosiloxane, and for example, the following production method can be employed. First, an organosiloxane mixture containing an organosiloxane, optionally a siloxane-based crosslinking agent, optionally a siloxane-based graft crossing agent, and optionally a siloxane oligomer having a terminal blocking group is emulsified by an emulsifier and water to prepare an emulsion. Thereafter, the mixture is polymerized at elevated temperatures using an acid catalyst, and then the acid is neutralized by an alkaline material to obtain a latex of polyorganosiloxane. Note that, in the following description of the production method, a case in which the "organosiloxane mixture" is used as a raw material for polymerization will be described, but the same production process can be applied to a case in which the "organosiloxane" is used.

In this manufacturing method, examples of a method of preparing an emulsion include a method of using a homomixer forming fine particles by a shearing force due to high speed rotation, a method of mixing by high speed stirring using a homogenizer forming fine particles by an injection output of a high pressure generator, and the like. Among these, a method using a homogenizer is a preferable method because the distribution of the particle diameter of the latex of the polyorganosiloxane becomes narrow.

Examples of the method of mixing the acid catalyst at the time of polymerization include (1) a method including collectively adding the acid catalyst together with the organosiloxane mixture, an emulsifier, and water, and mixing them, (2) a method including collectively adding an aqueous solution of the acid catalyst into an emulsion of the organosiloxane mixture, and (3) a method including adding an emulsion of the organosiloxane mixture dropwise into an aqueous solution of the acid catalyst at a high temperature at a constant rate and mixing them. Since the particle diameter of the polyorganosiloxane is easily controlled, a method including holding an emulsion of the organosiloxane mixture at a high temperature and then collectively adding an aqueous solution of the acid catalyst therein is preferred.

The polymerization temperature is preferably 50° C. or more, and more preferably 70° C. or more. In addition, the polymerization time is usually 2 hours or more, preferably 5 hours or more, when an aqueous solution of the acid catalyst is collectively added into an emulsion of the organosiloxane mixture and polymerized.

Further, since the crosslinking reaction between silanol groups proceeds at a temperature of 30° C. or less, in order to increase the crosslinking density of the polyorganosiloxane, after polymerization at a high temperature of 50° C. or higher, the produced latex may be hold about 5 to 100 hours at a temperature of 30° C. or less.

The polymerization reaction of the organosiloxane mixture can be terminated by neutralizing the reaction system containing the latex with an alkaline material such as sodium hydroxide, potassium hydroxide, or an aqueous ammonia solution to pH 6 to pH 8.

The emulsifier used in the above production method is not particularly limited as long as the organosiloxane mixture can be emulsified, but an anionic emulsifier or a nonionic emulsifier is preferred.

Examples of the anionic emulsifier include sodium alkylbenzenesulfonate, sodium alkyl diphenyl ether disulfonate, sodium alkyl sulfate, sodium polyoxyethylene alkyl sulfate, and sodium polyoxyethylene nonylphenyl ether sulfate.

Examples of the nonionic emulsifier include the following: polyoxyethylene alkyl ether, polyoxyethylene alkylene alkyl ether, polyoxyethylene distylenated phenyl ether, polyoxyethylene tribenzyl phenyl ether, polyoxyethylene polyoxypropylene glycol, and the like.

One kind of these emulsifiers may be used alone, or two or more kinds thereof may be used in combination.

The amount of the emulsifier to be used is preferably 0.05 to 10 parts by mass, and more preferably 0.1 to 5 parts by mass, with respect to 100 parts by mass of the organosiloxane mixture. Depending on the amount of emulsifier used, it is possible to adjust the particle size of the latex of the polyorganosiloxane to a desired value. When the amount of the emulsifier to be used is 0.05 parts by mass or more, emulsification stability of an emulsion of the organosiloxane mixture is sufficient. When the amount of the emulsifier is 10 parts by mass or less, the amount of the emulsifier remaining in the powder of the graft copolymer can be sufficiently reduced, so that the deterioration of the heat decomposition resistance and the surface appearance of the resin composition containing the graft copolymer and the resin can be suppressed.

Examples of the acid catalyst used for polymerization of the organosiloxane mixture include sulfonic acids such as aliphatic sulfonic acids, aliphatic substituted benzenesulfonic acids, and aliphatic substituted naphthalenesulfonic acids, and mineral acids such as sulfuric acid, hydrochloric acid, and nitric acid. One kind of these acid catalysts may be used alone, or two or more kinds thereof may be used in combination. Among these, when a mineral acid such as sulfuric acid, hydrochloric acid, or nitric acid is used, the particle diameter distribution of the polyorganosiloxane latex can be narrowed, and further, the deterioration of the thermal decomposition resistance of the molded article caused by the emulsifier component in the polyorganosiloxane latex and appearance defects can be reduced.

The amount of the acid catalyst to be used is preferably 0.005 to 5 parts by mass with respect to 100 parts by mass of the organosiloxane. When the amount of the acid catalyst to be used is 0.005 parts by mass or more, the polyorganosiloxane can be polymerized in a short time. Further, when the amount of the acid catalyst to be used is 5 parts by mass or less, a molded article having good heat decomposition resistance and good appearance can be obtained.

Further, since the amount of the acid catalyst to be used becomes a factor for determining the particle diameter of the polyorganosiloxane, in order to obtain a polyorganosiloxane having a particle diameter to be described later, it is more preferable to set the amount of the acid catalyst to be used to 0.005 to 1.5 parts by mass with respect to 100 parts by mass of the organosiloxane.

The mass average particle diameter of the latex of the polyorganosiloxane is preferably within a range of 250 to 1000 nm. By setting the mass average particle diameter of the latex of the polyorganosiloxane within the range of 250 to 1000 nm, it is possible to adjust the mass average particle diameter of the rubber (A) containing the polyorganosiloxane within the range of 300 to 2000 nm.

The "mass-average particle diameter Dw/number-average particle diameter Dn (Dw/Dn)" of the latex of the polyorganosiloxane is preferably within a range of 1.0 to 1.7, and more preferably within a range of 1.0 to 1.5. By setting Dw/Dn within the range of 1.0 to 1.7, a graft copolymer excellent in colorability when added to a resin can be obtained.

As the values of Dw and Dn, a value measured by the following method can be adopted.

Using a sample obtained by diluting a latex of a polyorganosiloxane with deionized water to a concentration of about 3% by mass, a particle diameter is measured using a particle size distribution meter CHDF2000 manufactured by MATEC Co., Ltd., USA. The median diameter is used as the average particle diameter.

Determination can be carried out under the following standards recommended by MATEC Co., Ltd.

Cartridge: dedicated capillary cartridge for separating particles (trade name; C-202),
Carrier liquid: dedicated carrier liquid (trade name; 2XGR500),
Liquid nature of carrier liquid: neutral,
Carrier liquid flow rate: 1.4 ml/min,
Pressure of carrier liquid: about 4000 psi (2600 kPa),
Measurement temperature: 35° C.,
Sample usage: 0.1 ml.

As the standard particle size material, monodispersed polystyrene materials of known particle size manufactured by DUKE, USA, which includes twelve types of particles within the range of 40 to 800 nm particle size are used.

An emulsifier may be added to the latex of the polyorganosiloxane obtained by the above method, if necessary, for the purpose of improving mechanical stability. As the emulsifier, an anionic emulsifier and a nonionic emulsifier which are the same as those exemplified above are preferred.

[Composite Rubber]

In the present invention, as the rubber (A) containing a polyorganosiloxane, a composite rubber containing a polyorganosiloxane and a polyalkyl(meth)acrylate (hereinafter, abbreviated as "composite rubber") can be used. The composite rubber is preferably a rubber containing the polyorganosiloxane and a polyalkyl(meth)acrylate having a glass transition temperature Tg of a homopolymer of 0° C. or less, and more preferably a rubber obtained by polymerizing an alkyl(meth)acrylate in the presence of a polyorganosiloxane rubber.

The polyalkyl(meth)acrylate (PA) constituting the composite rubber can be obtained by polymerizing an alkyl (meth)acrylate component (hereinafter, abbreviated as "(meth)acrylate component for composite rubber"). It is preferable that the (meth)acrylate component for composite rubber contains an alkyl(meth)acrylate in which the glass transition temperature Tg represented by the following FOX equation is 0° C. or less and −100° C. or higher, and a crosslinkable monomer.

$$1/(273+Tg)=\rho(wi/(273+Tgi))$$

In the equation, each symbol indicates the following:
Tg: glass transition temperature of the copolymer (° C.),
wi: mass fraction of monomer i,
Tgi: glass transition temperature (° C.) of a homopolymer obtained by polymerizing monomer i.

Note that, as a value of Tgi, a value described in POLYMER HANDBOOK Volume 1 (WILEY-INTERSCIENCE) is used.

Examples of the (meth)acrylate component for composite rubber include the following: methyl(meth)acrylate, ethyl (meth)acrylate, n-propyl(meth)acrylate, i-propyl(meth)acrylate, n-butyl(meth)acrylate, i-butyl(meth)acrylate, t-butyl (meth)acrylate, 2-ethylhexyl(meth)acrylate. One kind of these may be used alone, or two or more kinds thereof may be used in combination.

In order to set the glass transition temperature of the polyalkyl(meth)acrylate (PA) to 0° C. or less and −100° C. or higher, an alkyl(meth)acrylate having a glass transition temperature of a homopolymer of 0° C. or less and −100° C. or higher is preferably used in an amount of 50% by mass or more, more preferably 80% by mass or more. Provided that this mass % is a value based on 100% by mass of the total amount of the (meth)acrylate component for composite rubber to be subjected to polymerization.

Examples of the alkyl(meth)acrylate having a glass transition temperature of a homopolymer of 0° C. or less include ethylacrylate, n-propylacrylate, n-butylacrylate, i-butylacrylate, and 2-ethylhexylacrylate. One kind of these may be used alone, or two or more kinds thereof may be used in combination. Of these, n-butylacrylate is particularly preferred in consideration of the impact resistance of the thermoplastic resin composition and the gloss of the molded article.

Examples of the crosslinkable monomer include the following polyfunctional monomers: allyl methacrylate, triallyl cyanurate, triallyl isocyanurate, divinylbenzene, ethylene glycol diester dimethacrylate, propylene glycol diester dimethacrylate, dimethacrylic acid 1,3-butylene glycol diester, dimethacrylic acid 1,4-butylene glycol diester, diacrylic acid 1,6-hexanediol ester, triallyl trimellitate, and the like. One kind of these may be used alone, and two or more kinds thereof may be used in combination.

In the production of the composite rubber in the present invention, the amount of the crosslinkable monomer to be used in 100% by mass of the polyalkyl(meth)acrylate component is preferably 0.1 to 20.0% by mass, and more preferably 0.3 to 10.0% by mass. By setting the amount of the crosslinkable monomer to be used to 0.1 to 20.0% by mass, a molded body having excellent impact strength can be obtained.

The content of the polyorganosiloxane in 100% by mass of the composite rubber is preferably 12 to 50% by mass, more preferably 14 to 45% by mass, and still more preferably 15 to 40% by mass. When the content of the polyorganosiloxane is 12% by mass or more, a resin composition having excellent balance between impact strength and colorability can be obtained. Further, when the content is 50% by mass or less, a resin composition having excellent colorability can be obtained.

[Method for Producing Composite Rubber]

A method for producing the composite rubber in the present invention is not particularly limited and can be produced, for example, by an emulsion polymerization method, a suspension polymerization method, or a micro suspension polymerization method, but an emulsion polymerization method is preferably used. Among them, a method of obtaining a latex of a composite rubber by emulsion polymerization of a (meth)acrylate component for composite rubber in the presence of a latex of a polyorganosiloxane rubber is particularly preferred.

Examples of a method of preparing a mixture of a latex of a polyorganosiloxane rubber and a (meth)acrylate component for composite rubber include a method of adding the above alkyl (meth)acrylate and a crosslinkable monomer in a latex of a polyorganosiloxane rubber. Thus, the (meth)acrylate component for composite rubber (and the crosslinkable monomer) is impregnated into particles of the polyorganosiloxane rubber, and then a known radical polymerization initiator is acted on and the component is polymerized. In this production method, examples of a method of adding a (meth)acrylate component for composite rubber into a latex of a polyorganosiloxane rubber include a method of collectively adding the entire amount thereof and a method of adding dropwise at a constant rate.

In producing the latex of the composite rubber, an emulsifier may be added to stabilize the latex and to control the particle size of the composite rubber. The emulsifier is not particularly limited, and an anionic emulsifier and a nonionic emulsifier are preferred.

Examples of the anionic emulsifier include the following: sodium alkylbenzenesulfonate, sodium alkyldiphenyl ether disulfonate, sodium alkylsulfate, sodium polyoxyethylene alkyl sulfate, sodium polyoxyethylene nonylphenyl ether sulfate, sodium sarcosinate, fatty acid potassium salt, fatty acid sodium salt, dipotassium alkenylsuccinate, rosin acid soap, sodium polyoxyethylene alkyl phosphate, calcium polyoxyethylene alkyl phosphate, and the like.

Examples of the nonionic emulsifier include polyoxyethylene alkyl ether, polyoxyethylene distylenated phenyl ether, and polyoxyethylene tribenzyl phenyl ether.

One kind of these emulsifiers may be used alone, or two or more kinds thereof may be used in combination.

Examples of the radical polymerization initiator used for polymerization of the (meth)acrylate component for composite rubber include an azo-based initiator, a peroxide, and a redox-based initiator obtained by combining a peroxide and a reducing agent. One kind of these may be used alone, or two or more kinds thereof may be used in combination. Among these, an azo-based initiator and a redox-based initiator are preferred from the viewpoint of suppressing outgassing of a resin composition (particularly, an aromatic polycarbonate resin composition)

Examples of the azo-based initiator include the following: oil-soluble azo-based initiators such as 2,2'-azobisisobutyronitrile, dimethyl 2,2'-azobis(2-methylpropionate); water-soluble azo-based initiators such as 4,4'-azobis(4-cyanovaleric acid), 2,2'-azobis[N-(2-carboxymethyl)-2-methylpropionamidine]hydrate, 2,2'-azobis-(N,N'-dimethyleneisobutylamidine) dihydrochloride, 2,2'-azobis [2-(2-imidazolin-2-yl)propane]dihydrochloride. One kind of these may be used alone, or two or more kinds thereof may be used in combination.

Examples of the peroxide include the following: inorganic peroxides such as hydrogen peroxide, potassium persulfate, ammonium persulfate and the like; organic peroxides such as diisopropylbenzene hydroperoxide, p-menthane hydroperoxide, cumene hydroperoxide, t-butyl hydroperoxide, succinic acid peroxide, t-butyl peroxyneodecanoate, t-butyl peroxyneoheptanoate, t-butyl peroxypivalate, 1,1,3,3-tetramethylbutylperoxy-2-ethylhexanoate, t-butylperoxy-2-ethylhexanoate and the like. One kind of these peroxides may be used alone, or two or more kinds thereof may be used in combination.

Among these peroxides, an organic peroxide is preferably used from the viewpoint of suppressing outgassing of an aromatic polycarbonate resin composition. Of these, diisopropylbenzene hydroperoxide, p-menthane hydroperoxide, and cumene hydroperoxide are more preferred from the viewpoint of chemical resistance.

When the peroxide is used as a redox-based initiator in combination with a reducing agent, it is preferable to use the above peroxide, a reducing agent such as sodium formaldehyde sulfoxylate, L-ascorbic acid, fructose, dextrose, sorbose, or inositol, and a ferrous sulfate-ethylenediaminetetraacetic acid disodium salt in combination.

One kind of these reducing agents may be used alone, or two or more kinds thereof may be used in combination. When sodium formaldehyde sulfoxylate is used as the reducing agent, it is preferable to reduce the amount used as much as possible from the viewpoint of suppressing outgassing of the resin composition.

The amount of the radical polymerization initiator to be used is preferably 0.01 to 1 parts by mass with respect to 100 parts by mass of the composite rubber when an azo-based initiator is used.

In the case of using a redox-based initiator, the amount of the peroxide to be used is preferably 0.01 to 1 parts by mass with respect to 100 parts by mass of the composite rubber. The amount of the reducing agent to be used is preferably 0.01 to 1 parts by mass with respect to 100 parts by mass of the composite rubber.

[Mixture (B)].

In the presence of the above rubber (A), a mixture (B) of a vinyl monomer (b1) having an epoxy group and another vinyl monomer (b2) is graft-polymerized to form a graft portion made of a vinyl polymer on the rubber (A), whereby a polyorganosiloxane-containing graft copolymer can be obtained.

[Vinyl Monomer with Epoxy Group (b1)]

When a vinyl monomer (b1) having an epoxy group is contained in the mixture (B), a graft copolymer excellent in reactivity with a thermoplastic resin such as a polyester resin can be obtained, and a resin composition excellent in impact strength, colorability and tensile property and a molded article thereof can be obtained. In addition, in the case of an alloy of an aromatic polyester resin and an aromatic carbonate resin, by forming a graft portion using the mixture (B) containing the vinyl monomer (b1) having an epoxy group, the graft copolymer is easily disposed in the aromatic polyester resin, so that colorability is remarkably improved.

Examples of the vinyl monomer (b1) having an epoxy group include glycidyl methacrylate, glycidyl acrylate, vinyl glycidyl ether, allyl glycidyl ether, glycidyl ether of hydroxyalkyl (meth)acrylate, glycidyl ether of polyalkylene glycol (meth)acrylate, and glycidyl itaconate. Among them, glycidyl methacrylate is more preferred. These may be used alone or in combination of 2 or more thereof.

[Other Vinyl Monomers (b2)]

Other vinyl monomers (b2) can be used in admixture with the above vinyl monomer (b1) Other vinyl monomers (b2) include aromatic vinyl monomers such as styrene, α-methylstyrene, and vinyl toluene; alkyl methacrylates such as methyl methacrylate, ethyl methacrylate, n-butyl methacrylate, and i-butyl methacrylate; alkyl acrylates such as ethyl acrylate, n-butyl acrylate, and methyl acrylate; vinyl cyanide monomers such as acrylonitrile, methacrylonitrile; aryl (meth)acrylate in which the organic group of the ester group of phenyl (meth)acrylate, etc. is a phenyl group or substituted phenyl group; hydroxy group-containing monomers (hydroxy group-containing alkyl (meth)acrylate) such as 2-hydroxypropyl (meth)acrylate, 2-hydroxyethyl (meth) acrylate; unsaturated carboxylic acids such as acrylic acid, methacrylic acid, maleic acid, and itaconic acid; halogen group-containing monomers (halogen group-containing phenyl (meth)acrylate) such as monobromophenyl (meth) acrylate, dibromophenyl (meth)acrylate, 2,4,6-tribromophenyl (meth)acrylate, monochlorophenyl (meth)acrylate, dichlorophenyl (meth)acrylate, trichlorophenyl (meth)acrylate, etc.; thiol group-containing monomers (thiol group-containing alkyl (meth)acrylate) such as isopropylthiol methacrylate, etc.; amino group-containing monomers (amino group-containing (meth)acrylate) such as dimethylaminoethylmethacrylate, etc.; unsaturated anhydrides such as maleic anhydride, itaconic anhydride; and maleimide derivatives such as N-phenyl maleimide, N-cyclohexyl maleimide, N-t-butyl maleimide, etc.; and the like. These may be used singly or in combination of two or more thereof. Among these, an aromatic vinyl monomer, an alkyl (meth) acrylate, a vinyl cyanide monomer, and an aryl (meth)acrylate in which the organic group of the ester group is an aryl group such as a phenyl group or a substituted phenyl group are preferred from the viewpoint of compatibility with a resin and colorability of a resin composition. These vinyl monomers (b2) may be used singly or in combination of two or more thereof.

[Content of Vinyl Monomer (b1) in Vinyl Monomer Mixture (B)].

The content of the vinyl monomer (b1) having an epoxy group is preferably 0.1 to 20% by mass, more preferably 0.1 to 10% by mass, and still more preferably 1 to 5% by mass, based on the vinyl monomer mixture (B). When the vinyl monomer (b1) is contained in the vinyl monomer mixture (B) in an amount of 0.1% by mass or more, reactivity with a thermoplastic resin such as an aromatic polyester resin becomes good, and accordingly the interfacial strength is improved, and hence a resin composition excellent in impact resistance and colorability and a molded article thereof can be obtained. In particular, in the case of an alloy of an aromatic polyester resin and an aromatic carbonate resin, when the vinyl monomer (b1) is contained in an amount of 0.1% by mass or more in the vinyl monomer mixture (B), the graft copolymer is easily disposed in the aromatic polyester resin, so that the colorability is remarkably improved. Further, by setting the content of the vinyl monomer (b1) in the vinyl monomer mixture (B) to 20% by mass or less, since the graft copolymer is dispersed in a thermoplastic resin such as an aromatic polyester resin without aggregation, a resin composition excellent in impact resistance and colorability and a molded article thereof can be obtained.

[Epoxy Equivalents of Graft Copolymers]

The polyorganosiloxane-containing graft copolymer of the present invention has an epoxy equivalent of 2500 to 7800 g/eq measured by the following measurement method. A preferred range of the epoxy equivalent is from 3000 to 7600 g/eq, and a more preferred range is from 4000 to 6000 g/eq. The epoxy equivalent represents an amount of epoxy groups contained in the polyorganosiloxane-containing graft copolymer, and the smaller the value, the larger the amount of epoxy groups in the polyorganosiloxane-containing graft copolymer.

The epoxy groups are deactivated during polymerization and powder recovery, and are different from the charge amount for polymerization. Therefore, in the present invention, it has been found that the arrangement of the rubber in the alloy of the polyester and the polycarbonate resin is controlled by the epoxy equivalent of the polyorganosiloxane-containing graft copolymer. When the epoxy equivalent of the polyorganosiloxane-containing graft copolymer is 7800 g/eq or less, when the polyorganosiloxane-containing graft copolymer is added to the alloy of the polyester and the polycarbonate resin, the polyorganosiloxane-containing graft copolymer is arranged in the polyester phase and is remarkably excellent in colorability. Further, when the epoxy equivalent is 2500 g/eq or more, aggregation of the polyorganosiloxane-containing graft copolymer is suppressed, so that flowability and colorability are excellent.

(Measurement Method 1)

To 2.0 g of the polyorganosiloxane-containing graft copolymer, 50 ml of acetone (special grade) is added, stirred, and then 50 ml of ethanol (special grade) is added. To this solution, 10 ml of 0.2 mol/l hydrochloric acid-dioxane solution (special grade) is added, and the mixture is stirred at 70° C. for 20 minutes. Thereafter, the mixture is cooled to 25° C., titrated with 0.1 mol/l of potassium hydroxide-ethanol solution using a phenolphthalein indicator to an end point, and the value obtained in the titration is defined as "T". Also, for a 0.2 mol/l hydrochloric acid-dioxane solution used for measurement, titration is performed with a 0.1 mol/l of potassium hydroxide-ethanol solution using a phenolphthalein indicator to an end point, and the value obtained in the titration is defined as "B". Using these values, the epoxy equivalent is calculated by the following formula.

$$\text{Epoxy equivalent (g/eq)}=2.0\times1000/(0.994\times0.1\times(B+(A/5.61\times2.0)-T))$$

Note that "A" is an acid value of the polyorganosiloxane-containing graft copolymer.

[Content of Rubber (A) in Graft Copolymer (Powder)]

The content of the rubber (A) in the graft copolymer (powder) is preferably 10.0 to 99.9% by mass based on 100% by mass of the graft copolymer (powder). When the content of the rubber (A) is 10.0% by mass or more, the impact resistance of the resin composition and the molded article thereof becomes sufficient, and when the content is 99.9% by mass or less, the surface appearance of the molded article becomes good, and hence the content range is preferable. From the viewpoint of obtaining better impact resistance of the resin composition and the molded article thereof, the content of the rubber (A) is preferably 50.0% by mass or more, more preferably 60% by mass or more, and still more preferably 65.0% by mass or more, based on 100% by mass of the graft copolymer (powder). In addition, from the viewpoint of forming a sufficient amount of graft portion and improving the surface appearance (colorability) and tensile property of the resin composition and the molded article thereof, the content of the rubber (A) in the graft copolymer (powder) is preferably 90% by mass or less, more preferably 85% by mass or less, and still more preferably 80% by mass or less.

[Content of Graft Portion in Graft Copolymer]

From the viewpoint of obtaining a resin composition and a molded article thereof excellent in impact strength, colorability and tensile property, the content of the graft portion in the graft copolymer is preferably 10% by mass or more, more preferably 15% by mass or more, and still more preferably 20% by mass or more, based on 100% by mass of the graft copolymer.

In addition, from the viewpoint of improving the impact resistance of the resin composition and the molded article thereof by using a sufficient amount of the rubber (A) in the graft copolymer, the content of the graft portion in the graft copolymer is preferably 50% by mass or less, more preferably 40% by mass or less, and still more preferably 35% by mass or less, based on 100% by mass of the graft copolymer.

[Mass Average Particle Diameter of Graft Copolymer]

The mass average particle diameter of the polyorganosiloxane-containing graft copolymer of the present invention is 300 to 2000 nm, more preferably 300 to 1000 nm, still more preferably 300 to 800 nm, and still more preferably 350 to 600 nm. When the mass average particle diameter of the polyorganosiloxane-containing graft copolymer is 300 nm or more, the impact resistance and the colorability when added to a resin become good, and when the mass average particle diameter is set to 2000 nm or less, the dispersibility when added to a resin becomes good and the appearance of a molded article becomes good.

[Method for Producing Graft Copolymer]

Examples of the method of graft copolymerization (method of forming a graft portion) include a method in which a mixture (B) of a vinyl monomer (b1) and a vinyl monomer (b2) is added into a latex of a rubber (A), and polymerized in a single stage or multiple stages. In order to obtain good reactivity between the obtained polyorganosiloxane-containing graft copolymer and a thermoplastic resin such as an aromatic polyester resin, it is preferable to polymerize in a single stage or to add the vinyl monomer (b1) only in a final stage when polymerized in multiple stages because a graft portion having a reactive group can be efficiently formed in an outermost layer.

During the formation of the graft portion (graft copolymerization), an emulsifier can be added if necessary. Examples of the emulsifier used for forming the graft portion (graft copolymerization) include the same emulsifiers as those described above used in producing the rubber (A), and anionic emulsifiers and nonionic emulsifiers are preferred.

When a powder of a graft copolymer is recovered from a latex of the graft copolymer, any one of a spray drying method and a coagulation method can be used.

The spray drying method is a method in which a latex of a graft copolymer is sprayed into a drier in a microdroplet form, and a heating gas for drying is applied to the spray and dried. Methods for generating microdroplets include, for example, a rotating disk type, a pressure nozzle type, a two-fluid nozzle type, and a pressurized two-fluid nozzle type. The capacity of the dryer may be any one of a small volume, such as for use in a laboratory to a large volume, such as for industrial use. The temperature of the heating gas for drying is preferably 200° C. or less, more preferably 120 to 180° C. Latexes of 2 or more graft copolymers produced separately may also be spray dried together. Further, in order to improve the powder characteristics such as blocking during spray drying, bulk specific gravity, etc., the latex of the graft copolymer can also be spray-dried after adding an optional component such as silica.

The coagulation method is a method in which a latex of a graft copolymer is coagulated to separate, recover, and dry the graft copolymer. First, a latex of a graft copolymer is charged into hot water in which a coagulant is dissolved, salted out, and solidified, thereby separating the graft copolymer. Then, the separated wet graft copolymer is recovered graft copolymer having a reduced water content by dehydration or the like. The recovered graft copolymer is dried using a squeeze dehydrator or a hot air dryer.

Examples of the coagulant include inorganic salts such as aluminum chloride, aluminum sulfate, sodium sulfate, magnesium sulfate, sodium nitrate, and calcium acetate, and acids such as sulfuric acid, and calcium acetate is particularly preferred. One kind of these coagulants may be used alone or in combination of two or more kinds, but when two or more kinds are used, it is necessary to select a combination which does not form an insoluble salt in water. For example, when calcium acetate and sulfuric acid or a sodium salt thereof are used in combination, they form a calcium salt insoluble in water, which is not preferable.

The coagulant described above is usually used as an aqueous solution. The concentration of the coagulant aqueous solution is preferably 0.1% by mass or more, particularly 1% by mass or more, from the viewpoint of stably solidifying and recovering the graft copolymer. In addition, from the viewpoint of reducing the amount of coagulant remaining in the recovered graft copolymer and preventing deterioration in the molding appearance of a molded article, the concentration of the coagulant aqueous solution is preferably 20% by mass or less, particularly preferably 15% by mass or less. The amount of the coagulant aqueous solution is not particularly limited, but is preferably 10 parts by mass or more and 500 parts by mass or less with respect to 100 parts by mass of the latex.

A method of bringing the latex into contact with an aqueous coagulant solution is not particularly limited, and examples thereof include the following methods. (1) A method of continuously adding a latex therein while stirring an aqueous coagulant solution and holding it for a fixed time; (2) A method of continuously injecting a latex and an aqueous coagulant solution into a container with a stirrer at a constant ratio to contact with each other, and continuously withdrawing a mixture containing the coagulated polymer and water from the container.

The temperature at which the latex is brought into contact with the aqueous coagulant solution is not particularly limited, but is preferably 30° C. or more and 100° C. or less. There is no particular limitation on the contact time when the latex is brought into contact with the aqueous coagulant solution.

The coagulated graft copolymer is washed with water of about 1 to 100 times by mass, and the wet graft copolymer filtered off is dried using a flow dryer, a squeeze dehydrator, or the like. The drying temperature and the drying time may be appropriately determined by the obtained graft copolymer. It is also possible to directly feed the graft copolymer discharged from the flow dryer, the squeeze dehydrator, and the extruder after drying or dehydration, into an extruder or a molding machine for producing a resin composition, without recovering the graft copolymer, to mix it with a thermoplastic resin to obtain a molded body.

In the present invention, it is preferable that the graft copolymer is recovered using a coagulation method from the viewpoint of thermal decomposition resistance of a resin composition obtained by mixing with a thermoplastic resin.

<Thermoplastic Resin Composition>

The polyorganosiloxane-containing graft copolymer of the present invention can be mixed with a thermoplastic resin and used as a thermoplastic resin composition.

The thermoplastic resin which can be used in the present invention is not particularly limited, and examples thereof include one or more kinds of resins selected from thermoplastic resins and thermoplastic elastomers.

[Thermoplastic Resin]

Examples of the thermoplastic resin include the following. Olefin resins such as polypropylene (PP), polyethylene (PE); styrene (St)-based resins such as polystyrene (PS), high impact polystyrene (HIPS), (meth)acrylate-styrene copolymer (MS), styrene-acrylonitrile copolymer (SAN), styrene-maleic anhydride copolymer (SMA), acrylonitrile-butadiene-styrene copolymer (ABS), acrylic ester-styrene-acrylonitrile copolymer (ASA), acrylonitrile-ethylene-propylene rubber-styrene copolymer (AES); acrylic (Ac)-based resins such as polymethyl methacrylate (PMMA); polycarbonate (PC) resins; polyamide (PA) resins; polyester (PEs) resins such as polyethylene terephthalate (PET) resin, polybutylene terephthalate (PBT) resin; engineering plastics such as PPE-based resins such as polyphenylene ether (PPE) resin, modified polyphenylene ether (m-PPE) resins, polyoxymethylene (POM) resin, polysulfone (PSO) resin, polyarylate (PAr) resin, polyphenylene (PPS) resin; thermoplastic polyurethane (PU) resins; polyvinyl chloride (PVC) based resins such as hard vinyl chloride resins, semi-hard vinyl chloride resins, soft vinyl chloride resins; alloys of PC resins such as PC/ABS and St based resins; alloys of PVC resins such as PVC/ABS and St based resins, alloys of PA resins such as PA/ABS and St based resins; alloys of PA resins and thermoplastic elastomers (TPE); alloys of PA resins such as PA/PP and polyolefin resins; alloys of PC resins such as PC/PBT and PEs resins; alloys of olefinic resins such as PP/TPE, PP/PE with each other; alloys of PPE based resins such as PPE/HIPS, PPE/PBT, PPE/PA and other resins; alloys of PVC based resins such as PVC/PMMA and acrylic resins, and the like.

Examples of the thermoplastic elastomer include the following: styrene-based elastomers, olefin-based elastomers, vinyl chloride-based elastomers, urethane-based elastomers, polyester-based elastomers, polyamide-based elastomers, fluorine-containing elastomers, 1,2-polybutadiene, trans 1,4-polyisoprene, etc. Of these, urethane-based elastomers, polyester-based elastomers, and polyamide-based elastomers are preferred.

Among the thermoplastic resins described above, the following are preferred: St-based resins, PC resins, PA resins, PET resins, PBT resins, PPE resins, m-PPE resins, POM resins, PU resins, alloys of PC resins such as PC/ABS and St-based resins, alloys of PA resins such as PA/ABS and St-based resins, alloys of PA resins and TPE, alloys of PA resins such as PA/PP and polyolefin resins, alloys of PC resins such as PC/PBT and PEs resins, alloys of PPE-based resins such as PPE/PBT, PPE/PA and other resins, and the like.

In addition, among the resins described above, from the viewpoint of maximally exhibiting the effect of improving pigment colorability and impact resistance, a polyester resin is preferred, and an aromatic polyester is more preferred, and an alloy of a polyester resin and a polycarbonate is further preferred, and an alloy of an aromatic polyester resin and an aromatic polycarbonate is particularly preferred, and furthermore a polybutylene terephthalate resin among the aromatic polyester resins and a polycarbonate resin among the aromatic polyester resins are very preferred.

Examples of the polybutylene terephthalate resin (PBT resin) include commercially available products such as a trade name "TORAYCON" manufactured by Toray Industries, Inc., a trade name "NOVADURAN" manufactured by Mitsubishi Engineering Plastics Corporation, and a trade name "DURANEX" manufactured by Polyplastics Co., Ltd.

Furthermore, the polybutylene terephthalate resin can be obtained by polymerizing in a known method, and can be obtained, for example, by performing dehydration-condensation of terephthalic acid or an alkyl diester thereof and 1,4-butanediol in a known manner.

Examples of the aromatic polycarbonate resins include lupilon (registered trademark) S-1000, S-2000, S-3000, H-3000 or H-4000 (manufactured by Mitsubishi Engineering Plastics Corporation), or Panlite (registered trademark) L1250, L1225 or K1300 (manufactured by Teijin Limited), and the like.

The content of the polyorganosiloxane-containing graft copolymer in a total of 100% by mass of the thermoplastic resin and the polyorganosiloxane-containing graft copolymer is not particularly limited, but the content can be set in a range of 0.5 to 99.9% by mass, preferably 1 to 40% by mass, more preferably 1 to 30% by mass, and still more preferably 1 to 20% by mass. When the content of the graft copolymer is 0.5% by mass or more, a resin composition excellent in impact resistance can be obtained, and when the content is 99.9% by mass or less, a resin composition excellent in surface appearance can be obtained. The content of the resin component (the graft copolymer and the thermoplastic resin) in the resin composition of the present invention is not particularly limited as long as the desired characteristics can be obtained, but the content can be set in a range of, for example, 80 to 100% by mass, preferably 90% by mass or more, and more preferably 95% by mass or more, based on the resin composition. Components other than the resin component in the resin composition of the present invention include the following additives.

[Additives]

The thermoplastic resin composition may contain various additives as long as it does not depart from the object of the present invention. Examples of the additive include stabilizers such as phenol-based stabilizers, phosphorus-based stabilizers, ultraviolet absorbers, and amine-based light stabilizers; flame retardants such as phosphorus-based, bromine-based, silicone-based, and organometallic salt-based agents; modifiers for imparting various physical properties such as hydrolysis resistance; fillers such as titanium oxide and talc; dye pigments; and plasticizers. The content of the additive is not particularly limited as long as it does not depart from the object of the present invention, but the content can be set in a range of 20% by mass or less with respect to the thermoplastic resin composition, and is preferably 10% by mass or less, more preferably 5% by mass or less, and is preferably 0.1% by mass or more, more preferably 0.2% by mass or more, from the viewpoint of obtaining a sufficient addition effect.

When the thermoplastic resin is an aromatic polyester resin, for example, the following can be used as an additive: flameproofing agents, anti-drip agents (e.g., fluorinated polyolefins, silicones and aramid fibers), lubricants, mold release agents (e.g., pentaerythritol tetrastearate), nucleating agents, antistatic agents, stabilizers, fillers, reinforcing agents (e.g., glass fibers, carbon fibers, mica, kaolin, talc, $CaCO_3$ and glass flakes), dyes and pigments. These may be used singly or in combination of two or more thereof.

[Method for Preparing Resin Composition]

Although there is no particular limitation on the method for preparing the thermoplastic resin composition of the present invention, it can be prepared by mixing and dispersing a graft copolymer, a thermoplastic resin, and various additives used if necessary by a V-type blender, a Henschel mixer, or the like, and melt-kneading the mixture using an extruder or a kneader such as a Banbury mixer, a pressure kneader, a roll, or the like. The mixing of these respective components can be carried out batchwise or continuously, and the mixing order of each component is not particularly limited. The melt-kneaded product can be made into pellets and used for various types of molding.

[Molded Body]

A molded body according to the present invention is a molded body obtained by molding the above thermoplastic resin composition. Examples of a method of molding the thermoplastic resin composition include a method including a method of molding the thermoplastic resin composition or a mixture of the graft copolymer powder and the thermoplastic resin by an injection molding machine.

There is no particular limitation on the use of the molded body, and it can be widely used industrially as a material such as an automotive field, an OA equipment field, and an electric and electronic field.

EXAMPLES

Hereinafter, the present invention will be specifically described by way of Examples and Comparative Examples. Prior to the examples, various evaluation methods and production examples 1 to 2 of latex of polyorganosiloxane will be described. Examples 1 to 6 and Comparative Examples 1 to 8 are examples relating to the production and evaluation of the graft copolymer, and Examples 7 to 13 and Comparative Examples 9 to 23 are examples relating to the production and evaluation of the thermoplastic resin composition. In the production examples and examples and the like, "parts" and "%" mean "parts by mass" and "% by mass" respectively, unless otherwise specified.

<Evaluation Method>

(1) Solid Content

A latex of a polyorganosiloxane having a mass w1 is dried in a hot air dryer at 180° C. for 30 minutes, and the mass w2 of the residue after drying is measured, and the solid content [%] is calculated by the following formula.

Solid content [%]=$w2/w1 \times 100$ (2) Mass Average Particle Diameter (Dw)

Using a rubber latex or a graft copolymer latex diluted to a solid concentration of about 3% with deionized water as a sample, using the particle size distribution meter CHDF2000 manufactured by MATEC Co., Ltd., USA described above, the particle diameter is measured using the aforementioned conditions, and the mass-average particle diameter Dw is measured.

(3) Charpy Impact Strength

According to JIS K 7111, the Charpy impact strength of test pieces (80.0 mm length×10.0 mm width×4 mm thickness, with V-notch) is measured at 23° C. and −30° C.

(4) Charpy Impact Strength After Moist Heat Test.

Test pieces (length: 80.0 mm×width: 10.0 mm×thickness: 4 mm, with V-notches) are exposed to a condition at 120° C. at 2 atm for 48 hours using a pressure cooker tester, and then the Charpy impact strength thereof is measured at 23° C. according to JIS K 7111.

(5) Colorability

In accordance with JIS Z 8729 (method of expressing object colors based on L*a*b*color system), L* of test pieces obtained by injection molding are measured according to JIS Z 8722, using SE-4000 manufactured by Nippon Denshoku Industries Co., Ltd. The lower L*, the better the colorability.

(6) Flowability

Melt flow rate is measured according to JIS K 7210 at 250° C. and a load of 2.16 kgf (21.18N).

(7) Tensile Property

According to JIS K 7161, using a multi-purpose test piece shape defined by JIS-7139 molded by a one-point gate method, the measurement is performed at a temperature of 23° C. and at a test rate of 50 mm/min.

(8) Flexural Property

According to JIS K 7171. the measurement is performed using a test piece (length: 80.0 mm×width: 10.0 mm×thickness: 4 mm) at a temperature of 23° C. and at a test rate of 2 mm/min.

(9) Epoxy Equivalent of Polyorganosiloxane-Containing Graft Copolymer

According to the method described above (Measurement method 1), the epoxy equivalent is measured. Note that the acid value is set to 0 when an acid component such as acrylic acid is not contained in the polymer composition.

Production Example 1

Tetraethoxysilane (TEOS) of 2 parts, γ-methacryloyloxypropyldimethoxymethylsilane (DSMA) of 2 parts, and octamethylcyclotetrasiloxane (manufactured by Momentive Performance Materials Japan Co., Ltd., product name: TSF404) of 96 parts were mixed to obtain an organosiloxane mixture of 100 parts. An aqueous solution obtained by dissolving sodium dodecylbenzenesulfonate (DBSNa) of 1 parts in deionized water of 150 parts was added into the above mixture, stirred at 10,000 rpm for 5 minutes in a homomixer, and then passed through a homogenizer at a pressure of 20 MPa twice to obtain a stable premixed emulsion.

Then, after putting the emulsion into a 5 liter capacity separable flask equipped with a cooling condenser, the emulsion was heated to a temperature of 80° C., and then a mixture of 0.20 parts of sulfuric acid and 49.8 parts of distilled water was continuously charged over a period of 3 minutes. A state heated to 80° C. was maintained for 7 hours to undergo a polymerization reaction, and then cooled to room temperature (25° C.), and the obtained reaction solution was held at 25° C. for 6 hours. Thereafter, a 5% aqueous sodium hydroxide solution was added to neutralize the reaction solution to pH7.0 to obtain a polyorganosiloxane latex (A-1).

The solid content of the polyorganosiloxane latex (A-1) was 29.8% by mass. In addition, the number average particle diameter (Dn) of this latex by the aforementioned measuring method using the capillary type particle size distribution meter was 384 nm, the mass average particle diameter (Dw) was 403 nm, and Dw/Dn was 1.05.

Production Example 2

γ-methacryloyloxypropyldimethoxymethylsilane (DSMA) of 2 parts and a cyclic organosiloxane mixture (manufactured by Shin-Etsu Silicone Co., Ltd., product name: DMC, a mixture of cyclic organosiloxanes having 3 to 6 membered ring) of 98 parts were mixed to obtain an organosiloxane mixture of 100 parts. An aqueous solution obtained by dissolving sodium dodecylbenzenesulfonate (DBSNa) of 0.68 parts in deionized water of 150 parts was added into the above mixture, stirred at 10,000 rpm for 5 minutes in a homomixer, and then passed through a homogenizer at a pressure of 20 MPa twice times to obtain a stable premixed emulsion.

Then, an aqueous solution in which 10 parts of dodecylbenzenesulfonic acid (DBSH) was dissolved in 680 parts of deionized water was put into a 5 liter capacity separable flask equipped with a cooling condenser, and then the aqueous solution was heated to a temperature of 80° C., and then the above emulsion was continuously charged over a period of 240 minutes and subjected to a polymerization reaction, and then cooled to room temperature (25° C.), and a 5% aqueous sodium hydroxide solution was added to neutralize the reaction solution to pH7.0 to obtain a polyorganosiloxane latex (A-2)

The solid content of the polyorganosiloxane latex (A-2) was 18.2% by mass. In addition, the number average particle diameter (Dn) of this latex by the aforementioned measuring method using the capillary type particle size distribution meter was 67 nm, the mass average particle diameter (Dw) was 83 nm, and Dw/Dn was 1.24.

Example 1

29.8 parts of the polyorganosiloxane latex (A-1) obtained in Production Example 1 (10.0 parts in terms of polymer) was collected in a separable flask having a volume of 5 liters, and 160 parts of deionized water was added and mixed. Then, a mixture of 59.1 parts of butyl acrylate (BA), 0.9 parts of allyl methacrylate (AMA) and 0.25 parts of t-butyl hydroperoxide (t-BH) was added into this separable flask, and stirring was continued for 1 hours at 25° C., and impregnated into the polyorganosiloxane.

Nitrogen substitution of the atmosphere in the flask was carried out by passing a nitrogen air stream into this separable flask, and the liquid temperature was raised to 50° C. When the liquid temperature became 50° C., an aqueous solution in which 0.001 parts of ferrous sulfate (Fe), 0.003 parts of ethylenediaminetetraacetic acid disodium salt (EDTA), and 0.24 parts of sodium formaldehyde sulfoxylate (SFS) were dissolved in 10 parts of deionized water was added to initiate radical polymerization. In order to complete the polymerization of the acrylate component, a state at a liquid temperature of 65° C. was maintained for 1 hours, and a latex of a composite rubber of polyorganosiloxane and polyn-butyl acrylate was obtained.

The temperature of this latex was set at 65° C., a mixed liquid of 25.5 parts of methyl methacrylate (MMA), 1.5 parts of butyl acrylate (BA), 3.0 parts of glycidyl methacrylate (GMA), and 0.03 parts of t-butyl hydroperoxide (t-BH) was added dropwise into this latex over a period of 1 hours to initiate a graft polymerization reaction. After completion of the dropwise addition, at a temperature of 65° C., the mixture was maintained for 1 hours, and then cooled to 25° C., thereby obtaining a latex of a polyorganosiloxane-containing graft copolymer (G-1)

Then, 500 parts of an aqueous solution having a concentration of calcium acetate of 1% by mass was heated to 85° C., and 340 parts of the latex of the graft copolymer (G-1) was gradually added dropwise into this aqueous solution and solidified while stirring. The obtained graft copolymer (G-1) was filtered, washed, and dehydrated, and then dried to obtain a powder of the graft copolymer (G-1)

The polymerization ratio, the mass average particle diameter, and the epoxy equivalent of the obtained graft copolymer (G-1) are shown in Table 1. Note that this polymerization rate is a polymerization rate of the monomer component used in the entire process from the production of the composite rubber to the graft polymerization. The polymerization rate was determined by measuring the mass of the solid content of the latex subjected to sampling at the end of graft polymerization, and dividing this value by the mass of the solid content when it was assumed that all of the monomer components used in the entire process became the residue.

Examples 2 to 6, Comparative Examples 1 to 8

Polyorganosiloxane-containing graft copolymers (G-2 to G-6, and G'-1 to G'-8) were produced in the same manner as in Example 1, except that the type and amount of each raw material used in Example 1 were changed to the conditions shown in Table 1, and powders of graft copolymers were further obtained.

The polymerization ratio, the mass average particle diameter, and the epoxy equivalent of each of the obtained graft copolymers are shown in Table 1

Abbreviations in Table 1 are as follows.
BA: n-butyl acrylate
AMA: allyl methacrylate
MMA: methyl methacrylate
GMA: glycidyl methacrylate
HPMA: hydroxypropyl methacrylate
FM-1: unsaturated fatty acid hydroxyalkyl ester modified ε-caprolactone (trade name: PLACCEL FM-1, manufactured by Daicel Corporation)

TABLE 1

| | | | Example | | | | | | Comparative Example |
|---|---|---|---|---|---|---|---|---|---|
| | | | 1 | 2 | 3 | 4 | 5 | 6 | 1 |
| Graft copolymer | | | G-1 | G-2 | G-3 | G-4 | G-5 | G-6 | G'-1 |
| Rubber (A) portion | Polyorganosiloxane (A1) | type | A-1 | A-1 | A-1 | A-1 | A-1 | A-1 | A-1 |
| | | amount [part] | 10.0 | 10.0 | 10.0 | 10.0 | 20.0 | 30.0 | 10.0 |
| | Monomer for composite rubber | BA | 59.1 | 59.1 | 68.9 | 59.1 | 49.2 | 39.3 | 59.1 |
| | | AMA | 0.9 | 0.9 | 1.2 | 0.9 | 0.8 | 0.7 | 0.9 |
| | Si content in composite rubber | (wt %) | 14.3 | 14.3 | 12.5 | 14.3 | 28.6 | 42.9 | 14.3 |

TABLE 1-continued

| Graft portion | Vinyl monomer mixture (B) first stage | (b1) | GMA | 3.0 | 2.2 | 3.0 | 5.0 | 3.0 | 3.0 | — |
|---|---|---|---|---|---|---|---|---|---|---|
| | | | HPMA | — | — | — | — | — | — | — |
| | | | FM-1 | — | — | — | — | — | — | — |
| | | (b2) | MMA | 25.5 | 26.3 | 15.5 | 25.5 | 25.5 | 25.5 | 28.5 |
| | | | BA | 1.5 | 1.5 | 1.5 | 1.5 | 1.5 | 1.5 | 1.5 |
| | Vinyl monomer mixture (B) second stage | (b1) | GMA | — | — | — | — | — | — | — |
| | | (b2) | MMA | — | — | — | — | — | — | — |
| | | | BA | — | — | — | — | — | — | — |
| Polymerization ratio of graft copolymer | | (%) | | 100 | 100 | 100 | 100 | 100 | 100 | 100 |
| Mass average particle diameter of graft copolymer | | [nm] | | 533 | 535 | 530 | 533 | 494 | 441 | 545 |
| Epoxy equivalent of graft copolymer | | (g/eq) | | 5840 | 7590 | 5590 | 3390 | 5740 | 5640 | — |

| | | | | Comparative Example | | | | | | |
|---|---|---|---|---|---|---|---|---|---|---|
| | | | | 2 | 3 | 4 | 5 | 6 | 7 | 8 |
| Graft copolymer | | | | G'-2 | G'-3 | G'-4 | G'-5 | G'-6 | G'-7 | G'-8 |
| Rubber (A) portion | Polyorganosiloxane (A1) | type | | A-1 | A-2 | A-1 | A-1 | A-1 | A-1 | A-1 |
| | | amount [part] | | 8.0 | 10.0 | 30.0 | 10.0 | 10.0 | 30.0 | 8.0 |
| | Monomer for composite rubber | BA | | 74.0 | 74.8 | 58.9 | 59.1 | 59.1 | 58.9 | 74.0 |
| | | AMA | | 0.4 | 0.2 | 1.3 | 0.9 | 0.9 | 1.3 | 0.4 |
| | Si content in composite rubber | (wt %) | | 9.7 | 11.8 | 33.3 | 14.3 | 14.3 | 33.3 | 9.7 |
| Graft portion | Vinyl monomer mixture (B) first stage | (b1) | GMA | 2.0 | — | — | — | — | — | 8.0 |
| | | | HPMA | — | — | — | 3.0 | — | — | — |
| | | | FM-1 | — | — | — | — | 3.0 | 3.0 | — |
| | | (b2) | MMA | 6.0 | 10.0 | 9.3 | 25.5 | 26.5 | 6.3 | 0.0 |
| | | | BA | — | — | 0.5 | 1.5 | 0.5 | 0.5 | — |
| | Vinyl monomer mixture (B) second stage | (b1) | GMA | — | 5.0 | — | — | — | — | — |
| | | (b2) | MMA | 10.0 | — | — | — | — | — | 10.0 |
| | | | BA | — | — | — | — | — | — | — |
| Polymerization ratio of graft copolymer | | (%) | | 99 | 100 | 100 | 100 | 100 | 100 | 99 |
| Mass average particle diameter of graft copolymer | | [nm] | | 516 | 87 | 474 | 543 | 541 | 443 | 510 |
| Epoxy equivalent of graft copolymer | | (g/eq) | | 8040 | 3910 | — | — | — | — | 2070 |

Example 7, Comparative Examples 9 to 16

Powder of each polyorganosiloxane-containing graft copolymer (G-1), (G'-1) to (G'-7), polybutylene terephthalate resin (trade name: NOVADURAN 5010R5, manufactured by Mitsubishi Engineering Plastics Corporation), and carbon black (trade name: carbon black #960B, manufactured by Mitsubishi Chemical Corporation) were blended and mixed in the ratios described in Table 2. The formulation was dried at 120° C. for 12 hours and then fed to a 30 mmΦ twin screw extruder (L/D=30) and melt-mixed at a cylinder temperature of 260° C. and a screw rotation speed of 150 rpm and extruded to obtain pellets of thermoplastic resin compositions (H-1) to (H-9).

After drying the obtained pellets for 12 hours at 120° C., supplied to a 100 t injection molding machine (manufactured by Sumitomo Heavy Industries, Ltd., trade name: SE-100DU), and subjected to injection molding at a cylinder temperature of 260° C. and a mold temperature of 60° C., to obtain each "test piece 1" (length 80 mm, width 10 mm, thickness 4 mm), each "test piece 2" (length 100 mm, width 50 mm, thickness 2 mm), and each "test piece 3" (multipurpose test piece shape defined by JIS-7139 formed by a 1 point gate method). As for test piece 1, for Charpy impact test, in accordance with HS K 7111-1A, V-notch was cut by a notching machine.

Then, Charpy impact strength, Charpy impact strength after moist heat test, colorability, flowability, tensile property and flexural property were measured using each test piece. Evaluation results are given in Table 2.

[Comparison of Performance of Resin Compositions]

Example 7 was excellent in balance of impact strength, colorability, flowability, tensile property, and flexural property.

Since Comparative Example 9 did not contain a vinyl monomer having an epoxy group in the graft portion, the impact strength and tensile property (breaking point strength and tensile modulus) were inferior.

Since Comparative Example 12 did not contain a vinyl monomer having an epoxy group in the graft portion, and since the amount of the graft portion in the graft copolymer was relatively small (relatively large amount of the rubber portion), the tensile property (breaking point strength and tensile modulus) were inferior, and the colorability was also inferior.

Since Comparative Examples 14 and 15 did not contain a vinyl monomer having an epoxy group in the graft portion, the tensile property (tensile modulus) were inferior.

Since Comparative Example 16 did not contain a vinyl monomer having an epoxy group in the graft portion, and since the amount of the graft portion in the graft copolymer was relatively small (relatively large amount of the rubber portion), the tensile property (tensile modulus) was inferior and the colorability was also inferior.

In Comparative Example 10, since the Si content in the composite rubber was low, the colorability was inferior. In addition, since no monomer having an epoxy group was contained in the second layer (outermost layer) of the graft portion (as a result, the epoxy equivalent is large), the tensile property was inferior.

In Comparative Example 11, since the mass average particle diameter of the graft copolymer was small, the colorability was inferior.

Since Comparative Example 13 contained no graft copolymer, the impact strength was inferior.

50 mm, thickness 2 mm), and each "test piece 3" (multi-purpose test piece shape defined by JIS-7139 formed by a 1 point gate method). As for test piece 1, for Charpy impact test, in accordance with JIS K 7111-1A, V-notch was cut by a notching machine.

TABLE 2

|  |  |  | Example | Comparative Example | | | | | | | |
|---|---|---|---|---|---|---|---|---|---|---|---|
|  |  |  | 7 | 9 | 10 | 11 | 12 | 13 | 14 | 15 | 16 |
| Thermoplastic resin composition |  |  | H-1 | H-2 | H-3 | H-4 | H-5 | H-6 | H-7 | H-8 | H-9 |
| Graft | type |  | G-1 | G'-1 | G'-2 | G'-3 | G'-4 | — | G'-5 | G'-6 | G'-7 |
| copolymer | part |  | 10 | 10 | 10 | 10 | 10 | 0 | 10 | 10 | 10 |
| Polybutylene terephthalate resin | part |  | 90 | 90 | 90 | 90 | 90 | 100 | 90 | 90 | 90 |
| Carbon black | part |  | 0.1 | 0.1 | 0.1 | 0.1 | 0.1 | 0.1 | 0.1 | 0.1 | 0.1 |
| Charpy impact strength | 23° C. | [kJ/m$^2$] | 10.1 | 9.3 | 12.0 | 12.3 | 11.4 | 3.3 | 12.0 | 10.1 | 10.1 |
|  | −30° C. |  | 6.1 | 6.0 | 8.1 | 8.1 | 8.0 | 3.4 | 6.5 | 6.8 | 8.3 |
| Charpy impact strength after moist heat test | 23° C. | [kJ/m$^2$] | 3.1 | 2.8 | 3.5 | 5.3 | 2.9 | 1.4 | 2.7 | 2.9 | 3.4 |
| Colorability | L* | (—) | 20.2 | 18.0 | 21.4 | 30.6 | 24.0 | 11.8 | 19.5 | 19.1 | 24.8 |
| Flowability | MFR | [g/10 min] | 16.3 | 18.2 | 15.9 | 16.1 | 16.5 | 26.6 | 16.3 | 15.4 | 16.3 |
| Tensile test (50 mm/min) | Tensile modulus | [MPa] | 1700 | 1500 | 1300 | 1300 | 1400 | 1900 | 1300 | 1300 | 1400 |
|  | Yield strength | [MPa] | 46 | 45 | 45 | 41 | 43 | 56 | 46 | 47 | 44 |
|  | Breaking strength | [MPa] | 29 | 25 | 29 | 28 | 25 | 25 | 29 | 29 | 28 |
| Flexural test (2 mm/min) | Flexural modulus | [MPa] | 1900 | 1900 | 1900 | 1800 | 1800 | 2400 | 1900 | 1900 | 2000 |
|  | Maximum flexural strength | [MPa] | 66 | 66 | 65 | 60 | 64 | 82 | 65 | 66 | 68 |

Examples 8 to 13, Comparative Examples 17 to 23

Powders of each polyorganosiloxane-containing graft copolymer (G-1) to (G-6), (G'-1) to (G'-4), (G'-7), (G'-8), polybutylene terephthalate resin (trade name: NOVA-DURAN 5010R5, manufactured by Mitsubishi Engineering Plastics Corporation), a polycarbonate resin (trade name: Iupilon S-2000F, manufactured by Mitsubishi Engineering Plastics Corporation, viscosity-average molecular weight 24,000), carbon black (trade name: carbon black #960B, manufactured by Mitsubishi Chemical Corporation), and octadecylphosphate (trade name; ADK STAB AX-71, manufactured by ADEKA Corporation) as a phosphorus-based stabilizer were formulated and mixed in the ratios described in Table 3. The formulation was dried at 120° C. for 12 hours, and then fed to a 30 mmΦ twin screw extruder (L/D=30) to melt-mix at cylinder temperature of 260° C. and a screw rotation speed of 150 rpm and extruded to obtain pellets of thermoplastic compositions (H-10) to (H-22).

After drying the obtained pellets for 12 hours at 120° C., supplied to a 100 t injection molding machine (manufactured by Sumitomo Heavy Industries, Ltd., trade name; SE-100DU), and subjected to injection molding at a cylinder temperature of 260° C. and a mold temperature of 60° C., to obtain each "test piece 1" (length 80 mm, width 10 mm, thickness 4 mm), each "test piece 2" (length 100 mm, width Then, the Charpy impact strength, colorability, flowability, tensile property and flexural property were measured using each test piece. Evaluation results are given in Table 3.

[Comparison of Performance of Resin Compositions]

Examples 8 to 13 were excellent in balance of impact strength, colorability, flowability, tensile property, and flexural property, and particularly, colorability was remarkably excellent.

Since Comparative Examples 17, 20, and 22 did not contain a vinyl monomer having an epoxy group in the graft portion, the graft copolymer was not disposed in the PBT phase, and particularly, the colorability was inferior.

In Comparative Example 18, since the Si content in the composite rubber was low and the epoxy equivalent of the graft copolymer exceeded the upper limit in the range of 2500 to 7800 g/eq, the graft copolymer was not disposed in the PBT phase, and the colorability was inferior.

In Comparative Example 19, since the mass average particle diameter of the graft copolymer was small, the colorability was inferior.

Since Comparative Example 21 contained no graft copolymer, the impact strength was inferior.

In Comparative Example 23, since the epoxy equivalent of the graft copolymer was below the lower limit in the range of 2500 to 7800 g/eq (large amount of the epoxy group), the graft copolymer agglomerated, and the colorability and flowability were inferior.

TABLE 3

|  |  | Example | | | | | | Comparative Example |
|---|---|---|---|---|---|---|---|---|
|  |  | 8 | 9 | 10 | 11 | 12 | 13 | 17 |
| Thermoplastic resin composition |  | H-10 | H-11 | H-12 | H-13 | H-14 | H-15 | H-16 |
| Graft | type | G-1 | G-2 | G-3 | G-4 | G-5 | G-6 | G'-1 |
| copolymer | part | 8 | 8 | 8 | 8 | 8 | 8 | 8 |
| Polybutylene | part | 27.6 | 27.6 | 27.6 | 27.6 | 27.6 | 27.6 | 27.6 |

TABLE 3-continued

|  |  |  |  |  |  |  |  |  |
|---|---|---|---|---|---|---|---|---|
| terephthalate resin |  |  |  |  |  |  |  |  |
| Polycarbonate resin | part |  | 64.4 | 64.4 | 64.4 | 64.4 | 64.4 | 64.4 | 64.4 |
| Phosphorus-based stabilizer(AX-71) | part |  | 0.3 | 0.3 | 0.3 | 0.3 | 0.3 | 0.3 | 0.3 |
| Carbon black | part |  | 0.1 | 0.1 | 0.1 | 0.1 | 0.1 | 0.1 | 0.1 |
| Charpy impact strength | 23° C. | [kJ/m²] | 17.2 | 19.0 | 18.4 | 19.1 | 16.3 | 17.0 | 70.9 |
|  | −30° C. |  | 8.9 | 9.3 | 9.4 | 11.0 | 10.5 | 8.7 | 12.9 |
| Colorability | L* | (—) | 11.2 | 11.6 | 10.4 | 15.0 | 15.1 | 9.6 | 16.2 |
| Flowability | MFR | [g/10 min] | 7.8 | 7.6 | 7.3 | 7.2 | 7.1 | 6.8 | 8.5 |
| Tensile test (50 mm/min) | Tensile modulus | [MPa] | 1900 | 2300 | 2400 | 2100 | 2300 | 2100 | 1900 |
|  | Yield strength | [MPa] | 53 | 54 | 53 | 54 | 54 | 53 | 54 |
|  | Breaking strength | [MPa] | 49 | 49 | 48 | 48 | 49 | 47 | 50 |
| Flexural test (2 mm/min) | Flexural modulus | [MPa] | 2200 | 2300 | 2300 | 2300 | 2300 | 2200 | 2200 |
|  | Maximum flexural strength | [MPa] | 79 | 83 | 82 | 83 | 83 | 82 | 80 |

|  |  |  | Comparative Example |  |  |  |  |  |
|---|---|---|---|---|---|---|---|---|
|  |  |  | 18 | 19 | 20 | 21 | 22 | 23 |
| Thermoplastic resin composition |  |  | H-17 | H-18 | H-19 | H-20 | H-21 | H-22 |
| Graft copolymer | type |  | G'-2 | G'-3 | G'-4 | — | G'-7 | G'-8 |
|  | part |  | 8 | 8 | 8 | 0 | 8 | 8 |
| Polybutylene terephthalate resin | part |  | 27.6 | 27.6 | 27.6 | 30 | 27.6 | 27.6 |
| Polycarbonate resin | part |  | 64.4 | 64.4 | 64.4 | 70 | 64.4 | 64.4 |
| Phosphorus-based stabilizer(AX-71) | part |  | 0.3 | 0.3 | 0.3 | 0.3 | 0.3 | 0.3 |
| Carbon black | part |  | 0.1 | 0.1 | 0.1 | 0.1 | 0.1 | 0.1 |
| Charpy impact strength | 23° C. | [kJ/m²] | 74.0 | 71.8 | 65.8 | 5.9 | 71.6 | 68.9 |
|  | −30° C. |  | 19.3 | 12.1 | 30.6 | 5.1 | 14.2 | 18.1 |
| Colorability | L* | (—) | 20.9 | 28.0 | 21.3 | 2.5 | 14.2 | 18.3 |
| Flowability | MFR | [g/10 min] | 8.1 | 8.6 | 7.8 | 10 | 8.2 | 6.4 |
| Tensile test (50 mm/min) | Tensile modulus | [MPa] | 1900 | 1900 | 1900 | 1400 | 2100 | 2000 |
|  | Yield strength | [MPa] | 54 | 53 | 53 | 66 | 55 | 53 |
|  | Breaking strength | [MPa] | 52 | 50 | 51 | 51 | 45 | 52 |
| Flexural test (2 mm/min) | Flexural modulus | [MPa] | 2200 | 2200 | 2100 | 2500 | 2300 | 2200 |
|  | Maximum flexural strength | [MPa] | 79 | 78 | 77 | 96 | 84 | 82 |

INDUSTRIAL APPLICABILITY

A graft copolymer powder according to the present invention can be added to a resin and used, and is useful for improving colorability and mechanical properties of a resin composition and a molded article thereof. A resin composition and a molded article thereof according to the present invention can be widely used as materials such as an automotive field, an OA device, a home electric appliance, and an electric and electronic field such as a housing.

The invention claimed is:

1. A polyorganosiloxane-containing graft copolymer powder obtained by graft-polymerizing a mixture (B) of a vinyl monomer (b1) having an epoxy group and another vinyl monomer (b2) to a rubber (A) containing a polyorganosiloxane,
wherein a content of the polyorganosiloxane (A1) contained in the rubber (A) is 12 to 50% by mass,
a mass average particle diameter of the polyorganosiloxane-containing graft copolymer powder is 300 to 2000 nm, and
an epoxy equivalent of the polyorganosiloxane-containing graft copolymer powder is 2500 to 7800 g/eq.

2. The polyorganosiloxane-containing graft copolymer powder according to claim 1, wherein the graft portion of the polyorganosiloxane-containing graft copolymer powder comprises a single layer structure containing an epoxy group or a multilayer structure containing an epoxy group at least in an outermost layer.

3. The polyorganosiloxane-containing graft copolymer powder according to claim 1, wherein the vinyl monomer (b1) is contained in the vinyl monomer mixture (B) in an amount of 0.1 to 20% by mass.

4. The polyorganosiloxane-containing graft copolymer powder according to claim 1, wherein a content of the rubber (A) in the polyorganosiloxane-containing graft copolymer powder is in a range of 10 to 90% by mass.

5. A resin composition comprising a polyorganosiloxane-containing graft copolymer powder according to claim 1.

6. The resin composition of claim 5, comprising a thermoplastic resin.

7. The resin composition according to claim 6, comprising a polyester resin as the thermoplastic resin.

8. The resin composition according to claim 7, wherein the polyester resin is an aromatic polyester resin.

9. The resin composition according to claim 6, comprising a polyester resin and a polycarbonate resin as the thermoplastic resin.

10. The resin composition according to claim 9, wherein the polyester resin is an aromatic polyester resin and the polycarbonate resin is an aromatic polycarbonate resin.

11. A molded article comprising the resin composition according to claim 5.

* * * * *